US009582808B2

(12) United States Patent
Bhogal et al.

(10) Patent No.: US 9,582,808 B2
(45) Date of Patent: Feb. 28, 2017

(54) CUSTOMIZING A PRESENTATION BASED ON PREFERENCES OF AN AUDIENCE

(71) Applicant: International Business Machines Corporation, Armonk, NY (US)

(72) Inventors: Kulvir S. Bhogal, Pflugerville, TX (US); Gregory J. Boss, Saginaw, MI (US); Rick A. Hamilton, II, Charlottesville, VA (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 14/076,584

(22) Filed: Nov. 11, 2013

(65) Prior Publication Data

US 2014/0100927 A1 Apr. 10, 2014

Related U.S. Application Data

(63) Continuation of application No. 13/323,711, filed on Dec. 12, 2011.

(51) Int. Cl.
*G06Q 30/02* (2012.01)
*G06F 17/30* (2006.01)
(Continued)

(52) U.S. Cl.
CPC ....... *G06Q 30/02* (2013.01); *G06F 17/30029* (2013.01); *G06F 17/30056* (2013.01);
(Continued)

(58) Field of Classification Search
CPC ........................................................ G09B 5/06
See application file for complete search history.

(56) References Cited

U.S. PATENT DOCUMENTS 5,311,422 A * 5/1994 Loftin .................. G09B 19/165 703/2
5,572,648 A 11/1996 Bibayan
(Continued)

FOREIGN PATENT DOCUMENTS

CN 101567858 A 4/2011
EP 0961197 A1 1/1999
(Continued)

OTHER PUBLICATIONS

Bing search q=adapt%20presentation%20to%20audien Apr. 3, 2016.*

(Continued)

*Primary Examiner* — Jeffrey A Gaffin
*Assistant Examiner* — John M Heffington
(74) *Attorney, Agent, or Firm* — Yee & Associates, P.C.; Damion Josephs

(57) ABSTRACT

A data processing system and computer program product for customizing a presentation. A set of individual preferences for each individual of a plurality of individuals to form a set of audience preferences is determined, wherein each preference in the set of individual preferences is associated with one of a plurality of versions of the presentation. A set of versions of the presentation from the plurality of versions of the presentation is selected based on the set of audience preferences. The set of versions of the presentation selected from the plurality of versions of the presentation is presented.

10 Claims, 5 Drawing Sheets

START
502 SELECT A VERSION OF THE PRESENTATION FROM THE PLURALITY OF VERSIONS OF THE PRESENTATION IN RESPONSE TO DETERMINING THAT A LARGEST NUMBER OF THE AUDIENCE PREFERENCES ARE ASSOCIATED WITH THE VERSION OF THE PRESENTATION
504 PRESENT THE SELECTED VERSION OF THE PRESENTATION ON A DISPLAY DEVICE
506 ANOTHER INDIVIDUAL?
NO
YES
508 SELECT ANOTHER VERSION OF PLURALITY OF VERSIONS OF THE PRESENTATION BASED ON A SET OF INDIVIDUAL PREFERENCES FOR THE ANOTHER INDIVIDUAL
510 PRESENT THE ANOTHER VERSION OF PLURALITY OF VERSIONS OF THE PRESENTATION ON ANOTHER MOBILE DEVICE TO THE ANOTHER INDIVIDUAL
END

(51) Int. Cl.
*G06Q 10/10* (2012.01)
*G09B 5/06* (2006.01)

(52) U.S. Cl.
CPC ....... *G06F 17/30867* (2013.01); *G06Q 10/10* (2013.01); *G09B 5/06* (2013.01)

(56) References Cited

U.S. PATENT DOCUMENTS 5,634,018 A 5/1997 Tanikoshi et al.
5,799,292 A 8/1998 Hekmatpour
5,864,819 A 1/1999 De Armas et al.
6,052,676 A 4/2000 Hekmatpour
6,059,842 A 5/2000 Dumarot et al.
6,161,137 A 12/2000 Ogdon et al.
6,292,174 B1 9/2001 Mallett et al.
6,301,462 B1 * 10/2001 Freeman et al. ......... G09B 7/00 434/350
6,325,632 B1 * 12/2001 Chao ...................... G09B 19/06 434/118
6,411,796 B1 * 6/2002 Remschel ................ G09B 5/10 434/118
6,654,032 B1 11/2003 Zhu et al.
6,694,482 B1 * 2/2004 Arellano ........... G06F 17/30017 707/E17.009
6,714,778 B2 3/2004 Nykanen et al.
6,892,049 B2 * 5/2005 Phalp ............... G06Q 10/06311 434/219
6,928,461 B2 8/2005 Tuli
6,973,418 B1 12/2005 Kirshenbaum
7,007,235 B1 * 2/2006 Hussein ................. G06Q 10/10 715/751
7,103,836 B1 9/2006 Nakamura et al.
7,147,475 B2 * 12/2006 Sudo ........................ G09B 5/00 348/729
7,203,708 B2 4/2007 Liu et al.
7,216,002 B1 5/2007 Anderson
7,275,116 B1 9/2007 Hanmann et al.
7,340,534 B2 3/2008 Cameron et al.
7,360,166 B1 4/2008 Krzanowski
7,386,801 B1 6/2008 Horvitz et al.
7,454,386 B2 11/2008 Chakraborty
7,490,169 B1 2/2009 Ogdon et al.
7,530,020 B2 5/2009 Szabo
7,620,621 B2 11/2009 Fuselier et al.
7,620,895 B2 * 11/2009 Adkins .................... G09B 7/02 715/709
7,644,144 B1 * 1/2010 Horvitz .................. G06Q 10/10 709/203
7,660,604 B2 2/2010 Ueda
7,672,873 B2 3/2010 Kindig et al.
7,743,135 B2 6/2010 Azuma
7,747,719 B1 * 6/2010 Horvitz .................. G06Q 10/10 709/203
7,757,114 B2 7/2010 Watanabe
7,801,896 B2 9/2010 Szabo
7,853,900 B2 12/2010 Nguyen et al.
7,860,962 B2 12/2010 White et al.
7,925,616 B2 4/2011 Hurwood et al.
8,090,794 B1 * 1/2012 Kilat ................. G06F 17/30867 709/203
8,108,780 B2 * 1/2012 Abernethy ............. G06Q 30/02 705/12
8,225,229 B2 7/2012 Thorn et al.
8,271,631 B1 * 9/2012 Horvitz .................. G06Q 10/10 709/203
8,312,385 B2 11/2012 Bier
8,527,588 B2 9/2013 Beck et al.
8,548,848 B1 10/2013 Shaw et al.
8,597,031 B2 * 12/2013 Cohen ...................... G09B 5/06 434/322
8,602,794 B2 * 12/2013 Cohen ...................... G09B 7/00 434/219
8,670,018 B2 * 3/2014 Cunnington ........... G06Q 10/10 348/14.08
8,775,939 B2 * 7/2014 Van Melle ............. G06Q 10/10 715/730
8,903,768 B2 12/2014 Bhogal et al.
8,935,423 B1 1/2015 Johnson et al.
9,086,788 B2 7/2015 Bhogal et al.
9,183,560 B2 * 11/2015 Abelow ............... G06Q 10/067
2002/0083092 A1 6/2002 Simpson
2002/0140719 A1 10/2002 Amir et al.
2002/0184312 A1 12/2002 Chen et al.
2003/0211856 A1 * 11/2003 Zilliacus ................ G06Q 10/10 455/466
2003/0222876 A1 12/2003 Giemborek et al.
2003/0222890 A1 12/2003 Salesin et al.
2004/0044691 A1 3/2004 Wajda
2004/0049793 A1 3/2004 Chou
2004/0128624 A1 * 7/2004 Arellano .................. G09B 5/06 715/255
2004/0253991 A1 12/2004 Azuma
2005/0004885 A1 1/2005 Pandian et al.
2005/0132045 A1 6/2005 Hornback, Jr. et al.
2005/0138540 A1 6/2005 Baltus et al.
2005/0197906 A1 9/2005 Kindig et al.
2006/0002315 A1 1/2006 Theurer et al.
2006/0014546 A1 1/2006 Bodin et al.
2006/0041686 A1 2/2006 Caspi et al.
2006/0056304 A1 3/2006 Moore
2006/0066503 A1 3/2006 Sampsell et al.
2006/0085449 A1 4/2006 Sattler et al.
2006/0136828 A1 6/2006 Asano
2006/0184508 A1 8/2006 Fuselier et al.
2006/0238652 A1 10/2006 Parker et al.
2006/0288023 A1 12/2006 Szabo
2006/0288074 A1 * 12/2006 Rosenberg ........... G06Q 20/102 709/205
2007/0055939 A1 3/2007 Furlong et al.
2007/0127879 A1 * 6/2007 Frank ....................... H03G 3/32 386/234
2007/0132727 A1 6/2007 Garbow et al.
2007/0283403 A1 12/2007 Eklund et al.
2007/0288584 A1 12/2007 Tsai et al.
2008/0005233 A1 1/2008 Cai et al.
2008/0018582 A1 1/2008 Yang et al.
2008/0034320 A1 2/2008 Ben-Shachar et al.
2008/0133769 A1 6/2008 Salesky et al.
2008/0154907 A1 6/2008 Prasad et al.
2008/0214210 A1 * 9/2008 Rasanen ................. H04W 4/02 455/456.3
2008/0215992 A1 * 9/2008 Or .......................... G06Q 10/10 715/753
2008/0246775 A1 10/2008 Fisher et al.
2008/0275871 A1 11/2008 Berstis et al.
2008/0288992 A1 11/2008 Usman et al.
2008/0310722 A1 12/2008 Daniels et al.
2009/0012821 A1 1/2009 Besson et al.
2009/0013045 A1 1/2009 Maes et al.
2009/0055342 A1 * 2/2009 Gong ....................... G06N 5/04 706/47
2009/0082051 A1 * 3/2009 Ruotsi .................... G06Q 10/10 455/519
2009/0226152 A1 9/2009 Hanes
2009/0228211 A1 * 9/2009 Rasanen ................. H04W 4/02 702/1
2009/0300020 A1 12/2009 Chen et al.
2009/0307168 A1 * 12/2009 Bockius ............ G06F 17/30867 706/46
2009/0313329 A1 12/2009 Agrawal et al.
2010/0010921 A1 1/2010 Liu et al.
2010/0028846 A1 * 2/2010 Cohen ...................... G09B 5/04 434/323
2010/0037151 A1 * 2/2010 Ackerman ............. G06Q 10/10 715/753
2010/0131523 A1 5/2010 Yu et al.
2010/0153314 A1 * 6/2010 Forman ................ G06N 99/005 706/12
2010/0153413 A1 * 6/2010 Mok ................ G06F 17/30678 707/758
2010/0198654 A1 8/2010 Kumar et al.

(56) References Cited

U.S. PATENT DOCUMENTS

2010/0205041 A1* 8/2010 Rathod .............. G06Q 30/0204 705/7.33
2010/0235285 A1 9/2010 Hoffberg
2010/0293226 A1 11/2010 Beck et al.
2010/0332242 A1* 12/2010 Kamar .................. G06Q 10/02 705/1.1
2011/0029482 A1 2/2011 Gimson et al.
2011/0029658 A1 2/2011 Werth et al.
2011/0043652 A1 2/2011 King et al.
2011/0078532 A1 3/2011 Vonog et al.
2011/0078615 A1 3/2011 Bier
2011/0085211 A1 4/2011 King et al.
2011/0087679 A1* 4/2011 Rosato .............. G06F 17/30867 707/749
2011/0173256 A1 7/2011 Khalatian
2011/0173266 A1 7/2011 Ohashi et al.
2011/0195667 A1 8/2011 Hassan et al.
2011/0258574 A1 10/2011 Adams
2011/0295551 A1* 12/2011 Rasanen ................ H04W 4/02 702/150
2011/0302524 A1 12/2011 Forstall
2011/0314387 A1 12/2011 Gold et al.
2012/0004960 A1 1/2012 Ma et al.
2012/0016770 A1 1/2012 Thomas
2012/0050320 A1 3/2012 Verbeque et al.
2012/0054281 A1* 3/2012 Westmoreland ....... G06Q 10/10 709/205
2012/0084866 A1 4/2012 Stolfo
2012/0096014 A1* 4/2012 Davids .................. G06Q 10/10 707/749
2012/0124456 A1 5/2012 Perez et al.
2012/0166920 A1* 6/2012 Abujbara .............. G06Q 30/02 715/202
2012/0182384 A1 7/2012 Anderson et al.
2013/0091409 A1 4/2013 Jeffery
2013/0151624 A1 6/2013 Bhogal et al.
2013/0151973 A1 6/2013 Bhogal et al.
2013/0151976 A1 6/2013 Bhogal et al.
2013/0159021 A1 6/2013 Felsher
2013/0159822 A1 6/2013 Grossman et al.
2013/0159874 A1 6/2013 Bhogal et al.
2013/0159880 A1 6/2013 Bhogal et al.
2013/0326576 A1 12/2013 Zhang et al.
2014/0075331 A1 3/2014 Bhogal et al.
2014/0075341 A1 3/2014 Bhogal et al.
2014/0082518 A1 3/2014 Bhogal et al.
2014/0101253 A1 4/2014 Bhogal et al.
2014/0129520 A1 5/2014 Bhogal et al.

FOREIGN PATENT DOCUMENTS

JP 11327523 A 11/1999
JP 2005348262 A 12/2005
JP 2006268638 A 10/2006
JP 2006338531 A 12/2006
JP 2008234072 A 10/2008
JP 2009205278 A 9/2009
JP 2011100270 A 5/2011
WO 0198888 A2 12/2001
WO 0209086 A1 1/2002
WO 02054192 A2 7/2002
WO 2006127430 A1 11/2006
WO 2011161735 A1 12/2011

OTHER PUBLICATIONS

Bing search q=modify+presentation+to+audience+pr Apr. 3, 2016.*
Office Action, dated Aug. 15, 2014, regarding U.S. Appl. No. 14/082,123, 30 pages.
Office Action, dated Sep. 11, 2014, regarding U.S. Appl. No. 13/323,696, 28 pages.
Office Action, dated Aug. 15, 2014, regarding U.S. Appl. No. 13/325,950, 35 pages.
Notice of Allowance, dated Jul. 29, 2014, regarding U.S. Appl. No. 13/668,294, 19 pages.
Office Action, dated Feb. 27, 2015, regarding U.S. Appl. No. 13/326,007, 40 pages.
Final Office Action, dated Feb. 27, 2015, regarding U.S. Appl. No. 14/082,123, 20 pages.
Office Action, dated Mar. 6, 2015, regarding U.S. Appl. No. 14/082,128, 40 pages.
Notice of Allowance, dated Mar. 13, 2015, regarding U.S. Appl. No. 14/082,132, 51 pages.
Final Office Action, dated Feb. 12, 2015, regarding U.S. Appl. No. 13/323,696, 25 pages.
Final Office Action, dated Feb. 26, 2015, regarding U.S. Appl. No. 13/325,950, 19 pages.
Office Action, dated Oct. 13, 2015, regarding U.S. Appl. No. 13/323,711, 59 pages.
Final Office Action, dated Oct. 28, 2015, regarding U.S. Appl. No. 13/323,696, 30 pages.
Office action regarding U.S. Appl. No. 13/668,294, dated Feb. 28, 2014, 15 pages.
Office action regarding U.S. Appl. No. 13/668,294, dated Dec. 27, 2013, 15 pages.
Notice of allowance dated Apr. 22, 2014, regarding U.S. Appl. No. 13/323,681, 10 pages.
Office action dated Nov. 27, 2013, regarding U.S. Appl. No. 13/323,681, 20 pages.
Architecture for a Dynamic Information Area Control, IBM Technical Disclosure Bulletin, IBM Corp. New York, NY, 37 (10):245-246, Oct. 1, 1994.
Au et al., "Netscape Communicator's Collapsible Toolbars," In: CHI '98, Human Factors in Computing Systems, Conference Proceedings, ACM Press, New York, NY, pp. 81-86, Apr. 18, 1998.
Reimer et al., "Presence-Based, Context-Sensitive Real-Time Collaboration (RTC)—Research Directions for a New Type of eCollaboration System," 19th Bled eConference, eValues, Bled, Slovenia, Jun. 5-7, 2006, 16 pages.
Sato et al., "XFIG Version 3.2 Patchlevel 2 Users Manual," 4 pages.http://www.math.unm.edu/xfig/index.html, Jul. 2, 1998.
Bhogal et al., "Providing Feedback for Screen Sharing," U.S. Appl. No. 14/077,333, filed Nov. 12, 2013, 28 pages.
Bhogal et al., "Variable Refresh Rates for Portion of Shared Screens," U.S. Appl. No. 14/082,123, filed Nov. 16, 2013, 35 pages.
Bhogal et al., "Dynamic Screen Sharing for Optimal Performance," U.S. Appl. No. 14/082,128, filed Nov. 16, 2013, 2013, 31 pages.
"Create Custom Shows within a Presentation in PowerPoint," Microsoft Corporation, http://www.office.microsoft.com/en-us/powerpoint-help/creat-custom-shows-within-a-presentation, accessed Mar. 12, 2012, 1 page.
Porst, "X.5 iChat," Quarter Life Crisis—The World According to Sven-S. Porst, http://earthlingsoft.net/ssp/blog/2007/12/x5_chat, accessed Mar. 12, 2012, 20 pages.
Yun, "Manage and Monitor Meeting Bandwidth," Acrobat® Connect Pro User Community, http://www.connectusers.com/tutorials/2009/03/connection_status/index.php?format, accessed Mar. 12, 2012, 5 pages.
Notice of Allowance, dated Apr. 24, 2015, regarding U.S. Appl. No. 13/326,007, 14 pages.
Notice of Allowance, dated May 8, 2015, regarding U.S. Appl. No. 14/082,123, 14 pages.
Notice of Allowance, dated Apr. 28, 2015, regarding U.S. Appl. No. 14/082,128, 14 pages.
Office Action, dated May 21, 2015, regarding U.S. Appl. No. 13/323,696, 28 pages.
Notice of Allowance, dated May 12, 2015, regarding U.S. Appl. No. 13/325,950, 14 pages.
Dffice Action, dated Jul. 15, 2016, regarding U.S. Appl. No. 13/323,696, 36 pages.
Final Office Action, dated Apr. 27, 2016, regarding U.S. Appl. No. 13/323,711, 30 pages.
"Presentation slide different audience," Bing search, dated Apr. 17, 2016, 2 pages. Final Office Action dated Apr. 27, 2016 in copending related U.S. Appl. No. 13/323,711.

(56) References Cited

OTHER PUBLICATIONS

"Slide presentation target audience," Bing search, dated Apr. 17, 2016, 3 pages. Final Office Action dated Apr. 27, 2016 in copending related U.S. Appl. No. 13/323,711.
Office Action, dated Apr. 8, 2016, regarding U.S. Appl. No. 14/077,333, 55 pages.
Final Office Action, dated Aug. 31, 2016, regarding U.S. Appl. No. 14/077,333, 28 pages.
Notice of Allowance, dated Oct. 26, 2016, regarding U.S. Appl. No. 13/323,696, 8 pages.
Notice of Allowance, dated Nov. 10, 2016, regarding U.S. Appl. No. 14/077,333, 10 pages.
Office Action, dated Dec. 27, 2016, regarding U.S. Appl. No. 13/323,711, 34 pages.

* cited by examiner

100
PRESENTATION ENVIRONMENT
PLURALITY OF INDIVIDUALS
116
102
COMPUTER SYSTEM
CUSTOMIZER
108
SET OF INDIVIDUAL PREFERENCES
110
SET OF AUDIENCE PREFERENCES
PLURALITY OF VERSIONS OF THE PRESENTATION
112
114
SET OF VERSIONS OF THE PRESENTATION
104
106
DISPLAY DEVICE
118
GRAPHICAL USER INTERFACES

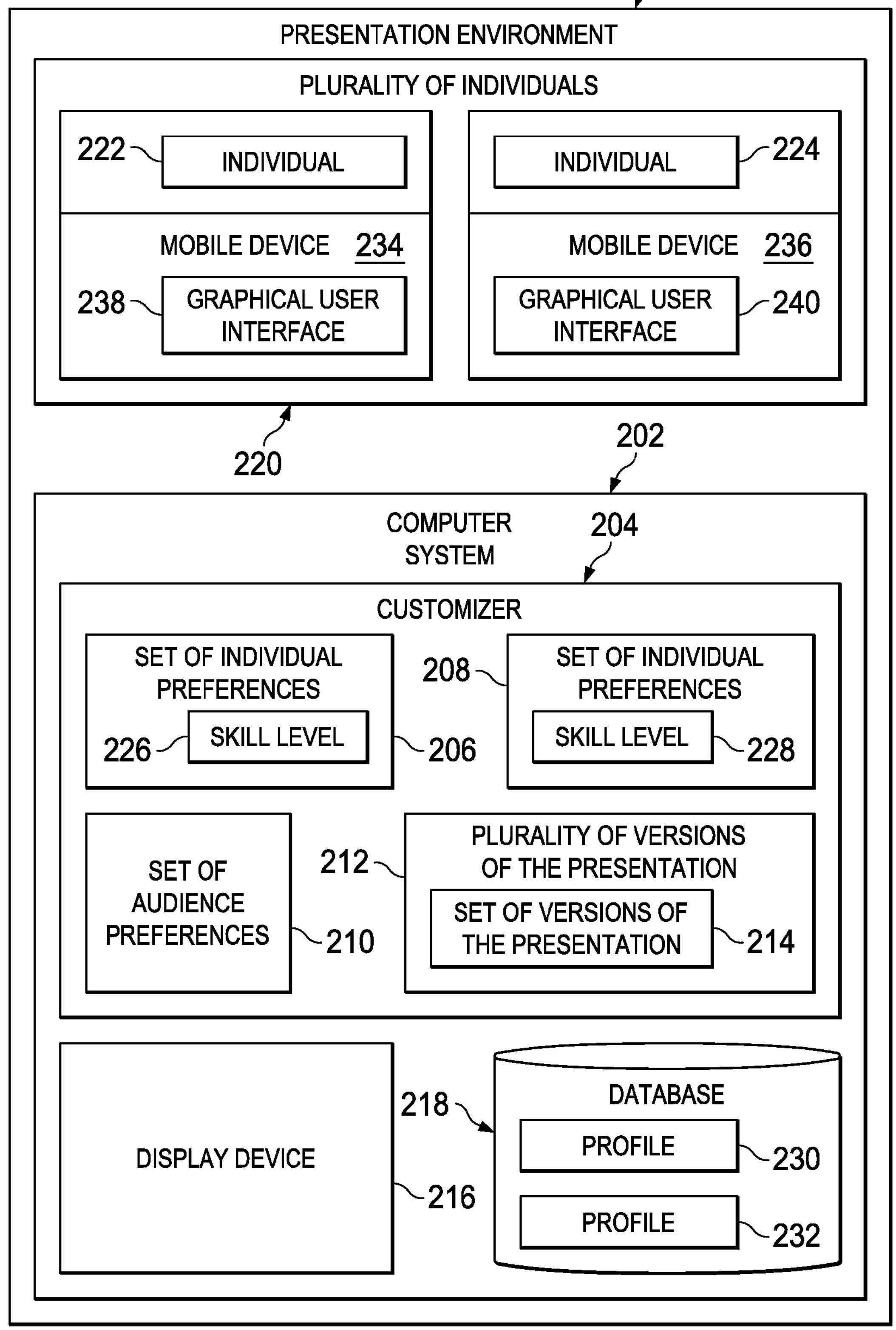
FIG. 2
200
PRESENTATION ENVIRONMENT
PLURALITY OF INDIVIDUALS
222
INDIVIDUAL
INDIVIDUAL
224
MOBILE DEVICE 234
MOBILE DEVICE 236
238
GRAPHICAL USER INTERFACE
GRAPHICAL USER INTERFACE
240
220
202
COMPUTER SYSTEM
204
CUSTOMIZER
SET OF INDIVIDUAL PREFERENCES
208
SET OF INDIVIDUAL PREFERENCES
226
SKILL LEVEL
206
SKILL LEVEL
228
SET OF AUDIENCE PREFERENCES
212
PLURALITY OF VERSIONS OF THE PRESENTATION
SET OF VERSIONS OF THE PRESENTATION
210
214
DISPLAY DEVICE
218
DATABASE
PROFILE
230
PROFILE
232
216

FIG. 6
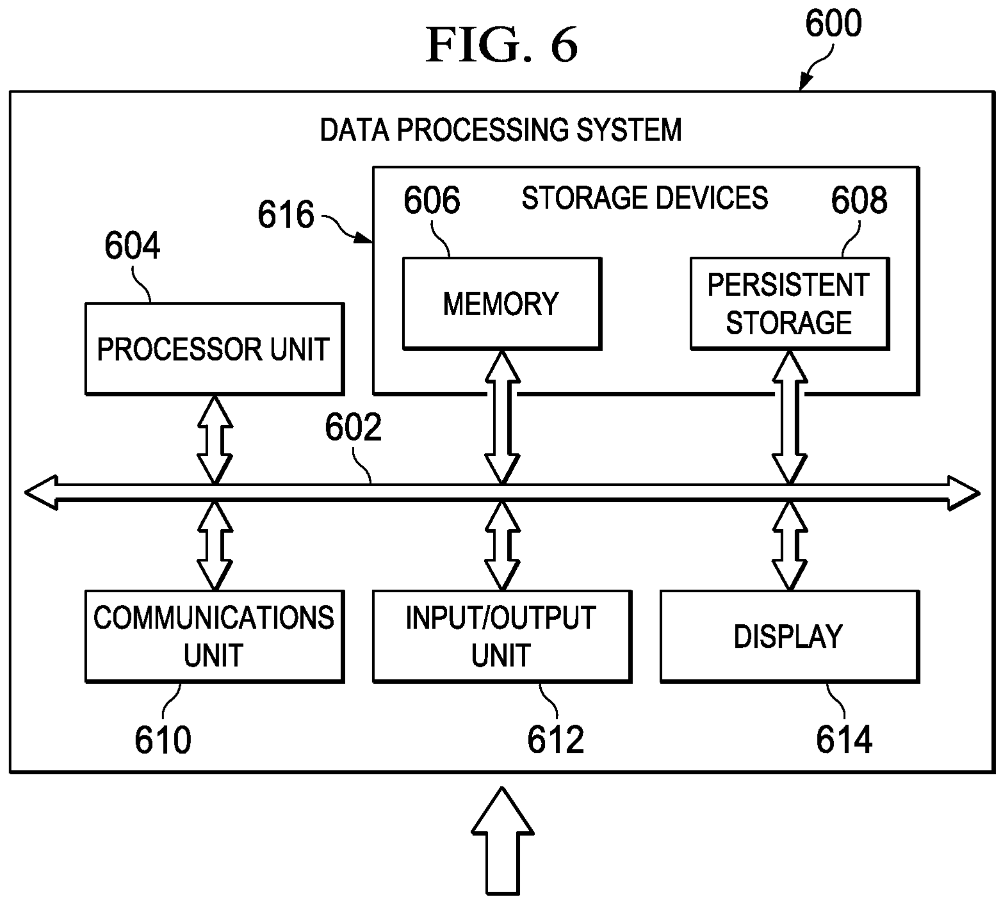
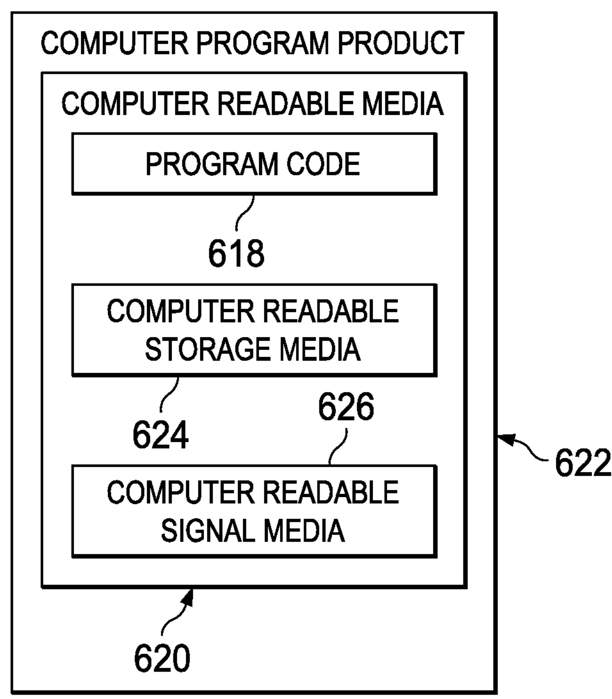

CUSTOMIZING A PRESENTATION BASED ON PREFERENCES OF AN AUDIENCE

This application is a continuation of application Ser. No. 13/323,711, filed Dec. 12, 2011.

BACKGROUND

1. Field

The present disclosure relates generally to customizing presentations and in particular to a system for customizing presentations based upon audience preferences. Still more particularly, the present disclosure relates to a system for customizing presentations based upon audience preferences, wherein one or more versions of a presentation are selected and presented based upon the audience preferences.

2. Description of the Related Art

Presentations are often given to audiences that include individuals with a variety of skills and interests. For example, an audience may include engineers and salespeople. Engineers may be interested in more technical details during a presentation, while salespeople may be interested in more information regarding marketing and sales.

Consequently, presenters often ask the audience about their background and preferences in order to tailor the content of the presentation to the audience. For example, if a presenter is giving a presentation to an audience consisting mostly of engineers, then the presenter may include technical information that is useful for the engineers. However, some of the audience members may prefer different information than the technical information or additional information. For example, a salesperson may be interested in marketing and sales information, while an executive may be interested in higher level information and less detailed information.

SUMMARY

The different illustrative embodiments provide a data processing system, and computer program product for customizing a presentation. A set of individual preferences for each individual of a plurality of individuals to form a set of audience preferences is determined, wherein each preference in the set of individual preferences is associated with one of a plurality of versions of the presentation. A set of versions of the presentation from the plurality of versions of the presentation is selected based on the set of audience preferences. The set of versions of the presentation selected from the plurality of versions of the presentation is presented.

BRIEF DESCRIPTION OF THE SEVERAL VIEWS OF THE DRAWINGS

FIG. 2 is an illustration of a presentation environment in which illustrative embodiments may be implemented;

FIG. 6 is an illustration of a data processing system in accordance with an illustrative embodiment.

DETAILED DESCRIPTION

Figure 1:
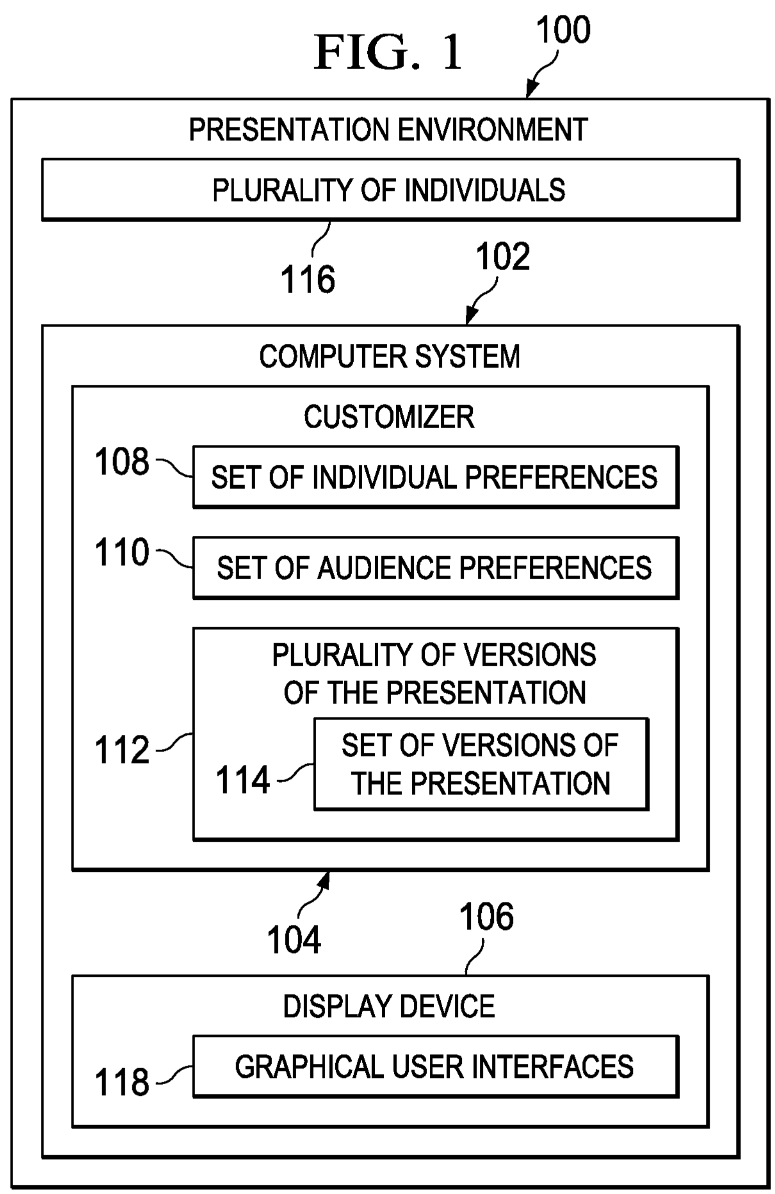
FIG. 1 is an illustration of a presentation environment in which illustrative embodiments may be implemented.

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, apparatus (systems) and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are processed on the computer or other programmable apparatus provide processes for implementing the functions/acts specified in the flowchart and/or block diagram block or blocks.

The different illustrative embodiments recognize and take into that account that presentations are often given to audiences that include members with a variety of skills and interests. The different illustrative embodiments recognize and take into account that audience members may prefer to see different versions of a presentation. The different illustrative embodiments recognize and take into account that customizing a presentation for an audience may be desirable.

Thus, the different illustrative embodiments provide method, data processing system, and computer program product for customizing a presentation. A set of individual preferences for each individual of a plurality of individuals to form a set of audience preferences is determined, wherein each preference in the set of individual preferences is associated with one of a plurality of versions of the presentation. A set of versions of the presentation from the plurality of versions of the presentation is selected based on the set of audience preferences. The set of versions of the presentation selected from the plurality of versions of the presentation is presented. As used herein, "set of" means one or more. For example, set of individual preferences means one or more individual preferences, set of audience preferences means one or more audience preferences, and set of versions means one or more versions.

With reference to FIG. 1, presentation environment 100 is depicted in accordance with an illustrative embodiment. As depicted, presentation environment 100 is an example of components in which the illustrative embodiments may be implemented.

In the depicted example, computer system 102 comprises customizer 104 and display 106. Customizer 104 comprises set of individual preferences 108, set of audience preferences 110, and plurality of versions of the presentation 112. Plurality of versions of the presentation 112 comprises set of versions of the presentation 114. Presentation environment 100 also comprises plurality of individuals 116.

In this illustrative example, customizer 104 determines set of individual preferences 108 for each individual of plurality of individuals 116 to form set of audience preferences 110. Each preference in set of individual preferences 108 is associated with one of plurality of versions of the presentation 112.

In the depicted example, customizer 104 selects set of versions of the presentation 114 from plurality of versions of the presentation 112 based on set of audience preferences 110. Customizer 104 presents set of versions of the presentation 114 from plurality of versions of the presentation 112.

In some illustrative examples, customizer 104 presents set of versions of the presentation 114 on graphical user interface 118 on display device 106. Display device 106 is a hardware device that is configured to display information. Display device 106 can be, for example, a screen, monitor, panel, projector, and any other device suitable for presenting set of versions of the presentation 114 to plurality of individuals 116. In some illustrative examples, customizer 104 presents set of versions of the presentation 114 on display device 106 to one or more individuals of plurality of individuals 116. Presenting set of versions of the presentation 114 can include presenting content and providing content. The content can be audio content, video content, and any other type of content suitable for presenting set of versions of the presentation 114. Furthermore, providing content can be making content available to one or more of plurality of individuals 116. For example, providing content can be displaying video content and playing audio content.

With reference now to FIG. 2, presentation environment 200 is depicted in accordance with an illustrative embodiment. Presentation environment 200 is an example of presentation environment 100 of FIG. 1. Presentation environment 200 comprises computer system 202. Computer system 202 is an example of computer system 102 of FIG. 1. Computer system 202 comprises customizer 204. Customizer 204 is an example of customizer 104 of FIG. 1.

In this illustrative example, customizer 204 comprises set of individual preferences 206, set of individual preferences 202, set of audience preferences 210, and plurality of versions of the presentation 212. Plurality of versions of the presentation 212 comprises set of versions of the presentation 214. Computer system 202 also comprises display device 216 and database 218. Presentation environment 200 also comprises plurality of individuals 220.

In the depicted example, plurality of individuals 220 comprises individual 222 and individual 224. Set of individual preferences 206 is for individual 222 and set of individual preferences 208 is for individual 224. In the depicted example, set of individual preferences 206 comprises skill level 226 and set of individual preferences 208 comprises skill level 228. A skill level can be a level of expertise associated with a type of content in plurality of versions of the presentation 212. A skill level can be a numerical value and any other type of value suitable for representing a level of expertise associated with a type of content in plurality of versions of the presentation 212. For example, for a presentation that includes software programming as a type of content, skill level 226 and skill level 228 can be a level of expertise associated with software programming.

Individual preferences can be at least one of skills, votes, preference for amount of detail in a presentation, preference for amount of technical detail in the presentation, preference for type of content in the presentation, and any other preference suitable for applying to a presentation. As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In the illustrative examples, preferences for an individual may be entered proactively by the individual, such as through a mobile device and web interface, or may be entered passively, such as through a device that reads proximity cards and badges from individuals.

In the depicted example, set of individual preferences 206 and set of individual preferences 208 can be stored in profile 230 and profile 232, respectively. Profile 230 and profile 232 are each stored in database 218. Therefore, determining set of individual preferences 206 and set of individual preferences 208 may include identifying an individual preference in profile 230 and profile 232, respectively.

In some illustrative examples, individual 222 and individual 224 may be prompted by customizer 204 to submit set of individual preferences 206 and set of individual preferences 208 to customizer 204, respectively. Customizer 204 may then identify set of individual preferences 206 and set of individual preferences 208. In some illustrative examples, mobile device 234 is for individual 222 and mobile device 236 is for individual 224. Individual 222 can submit set of individual preferences 206 through mobile device 234 and individual 224 can submit set of individual preferences 208 through mobile device 236. Touch panels, speech, speech recognition, keyboard, mouse, eye movement, and any other suitable means can be used for individual 222 and individual 224 to submit set of individual preferences 206 and set of individual preferences 208, respectively. In some illustrative examples, individual 222 can submit set of individual preferences 206 using graphical user interface 238 on mobile device 234 and individual 224 can submit set of individual preferences 208 using graphical user interface 238 on mobile device 236.

In some illustrative examples, customizer 204 selects a specific version of the presentation from plurality of versions of the presentation 212 in response to determining that a largest number of set of audience preferences 210 is associated with the specific version of the presentation. For example, if two individuals in plurality of individuals 220 have a high skill level for a particular type of content in the plurality of versions of the presentation 212 and a third individual in plurality of individuals 220 has a low skill level for the particular type of content in the plurality of versions of the presentation 212, then customizer 204 may select a version from plurality of versions of the presentation 212 that is suitable for presenting to individuals with a high skill level for the particular type of content. Other suitable methods may be used for selecting a version from plurality of versions of the presentation 212, such as exceeding a threshold number of individuals of an audience for a specified skill level and preference, exceeding a threshold percentage of individuals of the audience for the specified skill level and preference, reaching a majority of individuals of the audience for the specified skill level and preference, and receiving a largest number of votes from the audience for a specified skill level and preference.

In some illustrative examples, customizer 204 selects a specific version of the presentation from plurality of versions of the presentation 212 based on a set of individual preferences for a specific individual and presents the specific version of the presentation to the specific individual. For example, customizer 204 may select a specific version of the presentation from plurality of versions of the presentation 212 based set of individual preferences 206 and present the specific version of the presentation to individual 222. In some illustrative examples, customizer 204 may present the specific version of the presentation to individual 222 on mobile device 234.

In some illustrative examples, customizer 204 may also select a different version of the presentation from plurality of versions of the presentation 212 based set of individual preferences 208 and present the different version of the presentation to individual 224. In some illustrative examples, customizer 204 may present the different version of the presentation to individual 224 on mobile device 236.

In some illustrative examples, customizer 204 may also select one or more additional versions of the presentation from plurality of versions of the presentation 212 based on one or more additional sets of individual preferences and present the additional versions of the presentation to one or more additional individuals in plurality of individuals 220. Furthermore, each of the above presentations may be presented concurrently. The above presentations may also be presented concurrent with a version of the presentation that is presented to plurality of individuals 220. Therefore, one version if a presentation can be presented to an audience that includes plurality of individuals 220, while at the same time different versions of the presentation can be presented to different individuals in plurality of individuals 220 on different mobile devices or through any other means suitable for presenting the different versions of the presentation to the different individuals.

In some illustrative examples, presenting a version of plurality of versions of the presentation 212 includes presenting one or more slides. A slide is a single page of a version of set of versions of presentation 212. The slides can be presented in series. In some illustrative examples, more than one slide can be presented at once. Furthermore, in some illustrative examples, a version of plurality of versions of the presentation 212 that includes different slides and a different number of slides is presented to plurality of individuals 220 based on set of audience preferences 210 while a different version of plurality of versions of the presentation 212 that includes different slides and a different number of slides is presented to individual 222 based upon set of individual preferences 206. In some illustrative examples, one or more additional versions of the presentation 212 that include different slides and different numbers of slides are presented concurrently to one or more additional individuals in plurality of individuals 220 based on one or more additional sets of individual preferences.

The illustration of route generating environment 100 in FIG. 1 and customizer 200 in FIG. 2 is not meant to imply physical or architectural limitations to the manner in which an advantageous embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an advantageous embodiment.

For example, database 218 may be located outside of computer system 202 as part of a different computer system. In some illustrative examples, database 218 is replaced with one of a plurality of databases, each of which may be accessed through a wire and wireless connection. Furthermore, display device 216 may be located on a different computer system than computer system 202. For example, computer system 202 may transmit information through wire and wireless connections to a remote computer system that includes display device 216 in order to display a presentation. Therefore, display 216 may be remotely located from computer system 202. Furthermore, individuals in plurality of individuals may be in different locations from each other. For example, some individuals may be remotely located from display device 216.

Figure 3:
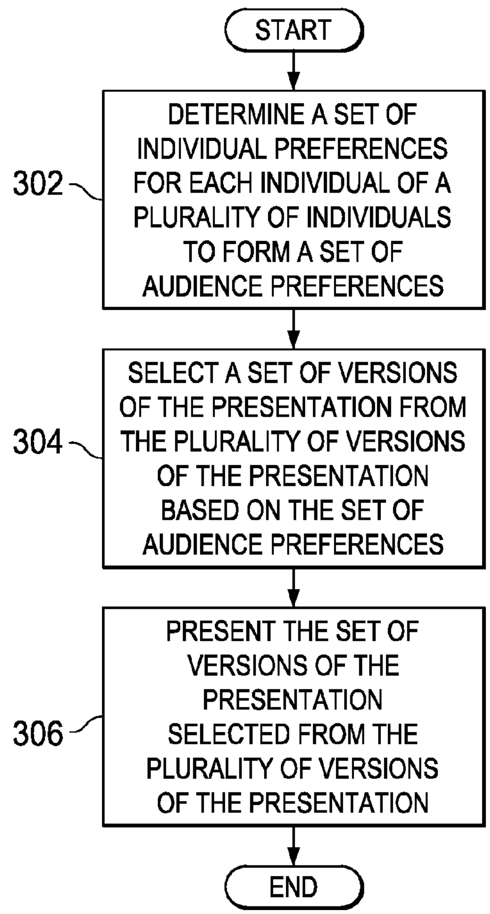
FIG. 3 is an illustration of a flowchart of a process for customizing a presentation in accordance with an illustrative embodiment

With reference now to FIG. 3, an illustration of a flowchart of customizing a presentation is depicted in accordance with an illustrative embodiment. The process illustrated in FIG. 3 may be implemented in a presentation environment, such as presentation environment 100 in FIG. 1 and presentation environment 200 in FIG. 2.

The process begins by determining a set of individual preferences 108 for each individual of a plurality of individuals 116 to form a set of audience preferences 110 (step 302). In some illustrative examples, each preference in the set of individual preferences 108 is associated with one of a plurality of versions of the presentation 112. The process selects a set of versions of the presentation 114 from the plurality of versions of the presentation 112 based on the set of audience preferences 110 (step 304). The process presents the set of versions of the presentation 114 selected from the plurality of versions of the presentation 112 (step 306). Thereafter, the process terminates.

Figure 4:
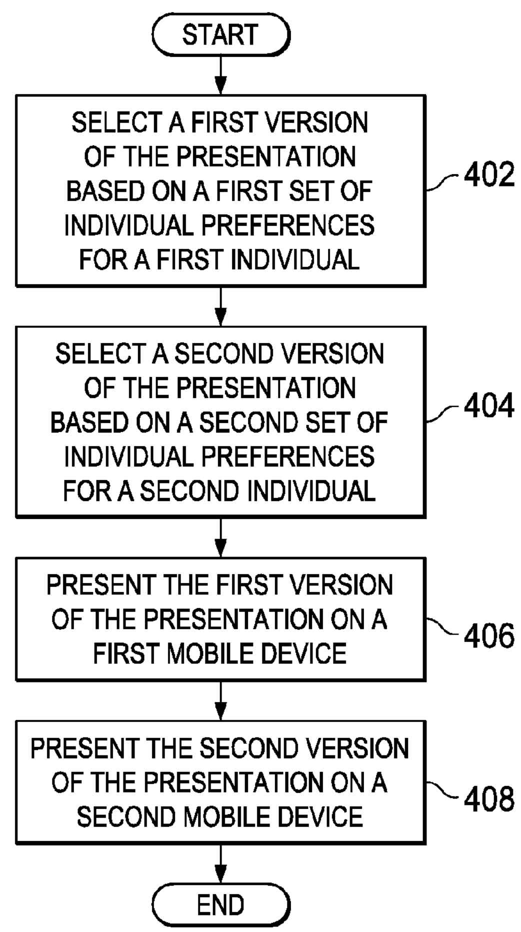
FIG. 4 is an illustration of a flowchart of a process for customizing a presentation in accordance with an illustrative embodiment.

With reference now to FIG. 4, an illustration of a flowchart of customizing a presentation is depicted in accordance with an illustrative embodiment. The process illustrated in FIG. 4 may be implemented in a presentation environment, such as presentation environment 100 in FIG. 1 and presentation environment 200 in FIG. 2.

The process begins by selecting a first version of the presentation based on a first set of individual preferences for a first individual (step 402). The process selects a second version of the presentation based on a second set of individual preferences for a second individual (step 404). The process presents the first version of the presentation on a first mobile device (step 406). The process presents the second version of the presentation on a second mobile device (step 408). Thereafter, the process terminates.

Figure 5:
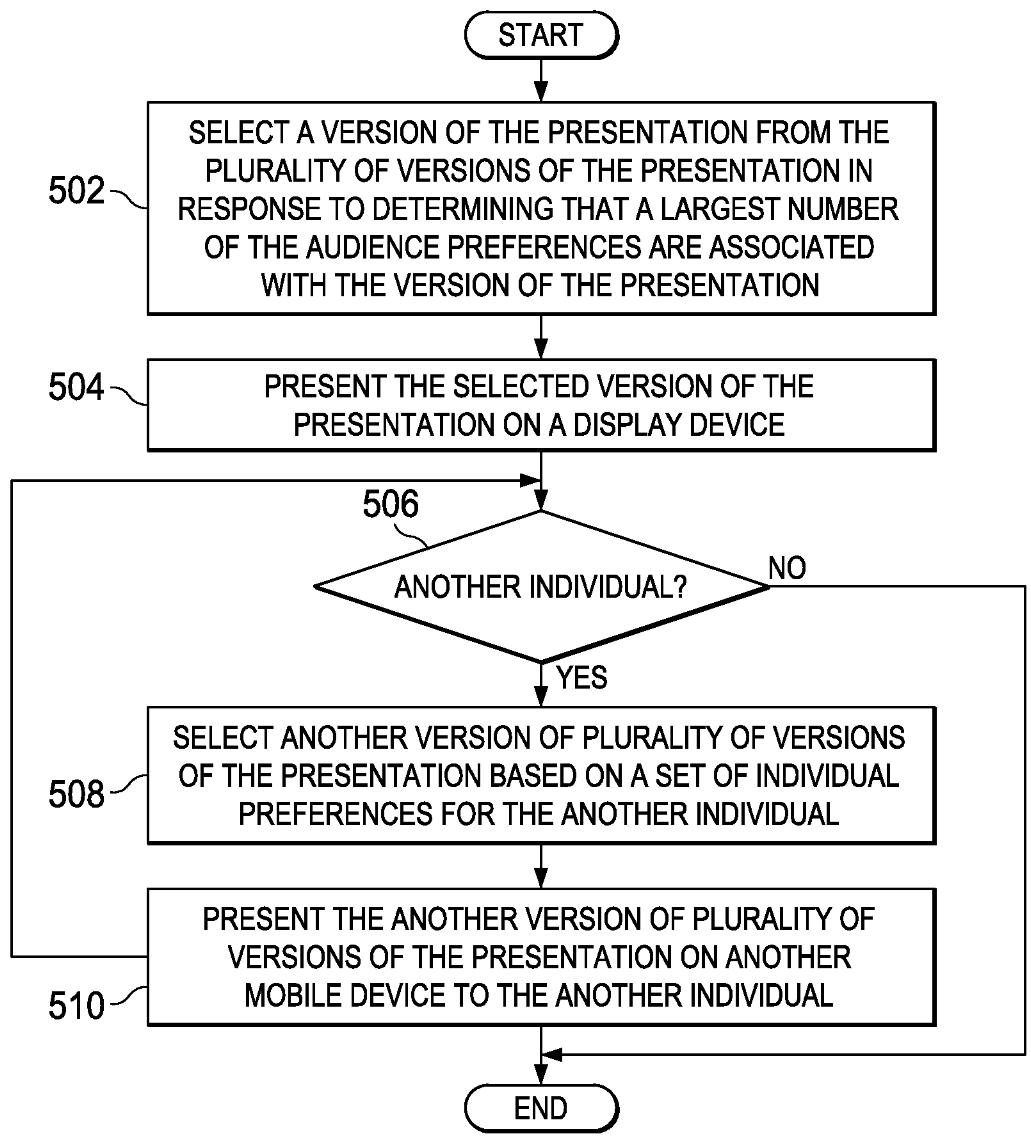
FIG. 5 is an illustration of a flowchart of a process for customizing a presentation in accordance with an illustrative embodiment.

With reference now to FIG. 5, an illustration of a flowchart of customizing a presentation is depicted in accordance with an illustrative embodiment. The process illustrated in FIG. 5 may be implemented in a presentation environment, such as presentation environment 100 in FIG. 1 and presentation environment 200 in FIG. 2.

The process begins by selecting a version of the presentation from the plurality of versions of the presentation 112 in response to determining that a largest number of the set of audience preferences 110 are associated with the version of the presentation (step 502). The process presents the selected version of the presentation on a display device 106 (step 504). In some illustrative examples, the selected version of the presentation is presented to the plurality of individuals 116 on display device 106. For example, a large presentation screen can present the selected version of the presentation to the plurality of individuals 116.

The process then determines whether there is another individual in plurality of individuals 116 (step 506). In some illustrative examples, the process begins with a first individual and loops through each individual in plurality of individuals 116. The process may select the first individual and remaining individuals in order based upon proximity to computer system 202, a priority and seniority associated with each individual, a random selection, and any other method suitable for determining an order to process plurality of individuals 116. If there is not another individual in the plurality of individuals 116 to send a version of the presentation to, the process terminates.

If there is another individual in the plurality of individuals 116 that has not yet been sent a version of the presentation, the process selects another version of the plurality of versions of the presentation 112 based on a set of individual preferences 108 for the another individual (step 508). The process then presents the another version of the plurality of versions of the presentation 112 on another mobile device to the another individual (step 510). For example, one version of the presentation can be presented on the large presentation screen based on set of audience preferences 110, while another version of the presentation can be presented concurrently to the another individual on the another mobile device based on a set of individual preferences 108 for the another individual.

In some illustrative examples, the version of the presentation presented on the large presentation screen can be the same as the version presented to the another individual on the another mobile device. In some illustrative examples, if the version of the presentation presented on the large presentation screen is the same as the version presented to the another individual on the another mobile device, then the version is not presented on the another mobile device. In some illustrative examples, the process loops through only a portion of plurality of individuals 116. For example, the process may only loop through individuals in plurality of individuals 116 for which a different version of the presentation is selected based on a set of individual preferences 108 for the individual than the version shown based on set of audience preferences 110. The process then returns to step 506.

Turning now to FIG. 6, an illustration of a data processing system is depicted in accordance with an illustrative embodiment. In this illustrative example, data processing system 600 includes communications fabric 602, which provides communications between processor unit 604, memory 606, persistent storage 608, communications unit 610, input/output (I/O) unit 612, and display 614. Data processing system 600 is an example of one implementation for computer system 102 in FIG. 1.

Processor unit 604 serves to run instructions for software that may be loaded into memory 606. Processor unit 604 may be a number of processors, a multi-processor core, or some other type of processor, depending on the particular implementation. A number, as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 or run by processor unit 604. The processes of the different embodiments may be performed by processor unit 604 using computer implemented instructions, which may be located in a memory, such as memory 606.

These instructions are referred to as program code, computer usable program code, or computer readable program code that may be read and run by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 and run by processor unit 604. Program code 618 and computer readable media 620 form computer program product 622 in these examples. In one example, computer readable media 620 may be computer readable storage media 624 or computer readable signal media 626. Computer readable storage media 624 may include storage devices, such as, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage device, such as a hard drive, a thumb drive, or a flash memory, that is connected to data processing system 600. In some instances, computer readable storage media 624 may not be removable from data processing system 600. In these illustrative examples, computer readable storage media 624 is a non-transitory computer readable storage medium.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, or some other device capable of storing and transmitting program code 618.

Program code 618 may be downloaded over a network from a remote data processing system to computer readable storage media 624 in data processing system 600. Furthermore, data processing system 600 may be a server data processing system, and program code 618 may be downloaded over the network to the remote data processing system for use in another computer readable storage media in the remote data processing system.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 600 is any hardware apparatus that may store data. Memory 606, persistent storage 608, and computer readable media 620 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606, or a cache, such as found in an interface and memory controller hub that may be present in communications fabric 602.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the invention is a method, data processing system, and computer program product for customizing a presentation. A set of individual preferences for each individual of a plurality of individuals to form a set of audience preferences is determined, wherein each preference in the set of individual preferences is associated with one of a plurality of versions of the presentation. A set of versions of the presentation from the plurality of versions of the presentation is selected based on the set of audience preferences. The set of versions of the presentation selected from the plurality of versions of the presentation is presented.

One or more of the illustrative embodiments customize a presentation based on a set of audience preferences. The illustrative embodiments may provide an effective process for automatically adjusting a presentation for an audience based upon preferences of individuals of the audience. The illustrative embodiments may provide an effective process for presenting different versions of the presentation to individuals based upon preferences of individuals. These results may save time because presenters do not have to spend as much time determining what type of content to present and individuals will not have to search for different content and different versions of a presentation.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing computer system for customizing a presentation comprising:

a bus;

a communications unit connected to the bus;

a storage device connected to the bus, wherein the storage device stores program code; and a processor unit connected to the bus, wherein the processor unit is configured to run the program code to:

determine a set of individual preferences for each individual of a plurality of individuals to form a set of audience preferences, wherein each preference in the set of individual preferences is associated with one of a plurality of versions of the presentation;

select a first set of slides of a first version of the presentation from the plurality of versions of the presentation based on a first set of audience preferences and a different second set of slides of a different second version of the presentation from the plurality of versions of the presentation based on a second set of audience preferences to form a set of versions of the presentation, wherein selection criteria includes criteria comprising: exceeding a threshold number of individuals of an audience for a specified skill level and preference, exceeding a threshold percentage of individuals of the audience for the specified skill level and preference, reaching a majority of individuals of the audience for the specified skill level and preference, receiving a largest number of votes from the audience for the specified skill level and preference, and the set of individual preferences for a specific individual; and present the first version to a corresponding first portion of the audience and the different second version of the set of versions of the presentation selected from the plurality of versions of the presentation to a corresponding second portion of the audience concurrently.

2. The data processing computer system of claim 1, wherein an individual preference in the set of individual preferences for an individual comprises a skill level of the individual associated with a type of content in the presentation.

3. The data processing computer system of claim 1, wherein in being configured to run the program code to select the first set of slides of the first version of the presentation from the plurality of versions of the presentation based on the first set of audience preferences and the different second set of slides of the different second version of the presentation from the plurality of versions of the presentation based on the second set of audience preferences to form the set of versions of the presentation, the processor unit is configured to run the program code to select the first version of the presentation from the plurality of versions of the presentation in response to determining that a largest number of the set of audience preferences is associated with the first version of the presentation.

4. The data processing computer system of claim 1, wherein in being configured to run the program code to select the first set of slides of the first version of the presentation from the plurality of versions of the presentation based on the first set of audience preferences and the different second set of slides of the different second version of the presentation from the plurality of versions of the presentation based on the second set of audience preferences to form the set of versions of the presentation, the processor unit is configured to run the program code to select a version of the presentation from the plurality of versions of the presentation based on the set of individual preferences for an individual in the plurality of individuals and wherein in being configured to run the program code to present the set of versions of the presentation selected from the plurality of versions of the presentation, the processor unit is configured to run the program code to present at least one of the first version and the different second version of the presentation on a mobile device.

5. The data processing computer system of claim 1, wherein in being configured to run the program code to present the first set of slides of the first version of the presentation selected from the plurality of versions of the presentation based on the first set of audience preferences and the different second set of slides of the different second version of the presentation from the plurality of versions of the presentation based on the second set of audience preferences to form the set of versions of the presentation, the processor unit is configured to run the program code to present the first set of slides, and wherein the processor unit is further configured to run the program code to present on a mobile device the different second set of slides based on the set of individual preferences for an individual of the plurality of individuals.

6. A computer program product for customizing a presentation comprising:

a non-transitory computer readable storage device;

program code, stored on the non-transitory computer readable storage device, for determining a set of individual preferences for each individual of a plurality of individuals to form a set of audience preferences, wherein each preference in the set of individual preferences is associated with one of a plurality of versions of the presentation;

program code, stored on the non-transitory computer readable storage device, for selecting a first set of slides of a first version of the presentation from the plurality of versions of the presentation based on a first set of audience preferences and a different second set of slides of a different second version of the presentation from the plurality of versions of the presentation based on a second set of audience preferences to form a set of versions of the presentation, wherein selection criteria includes criteria comprising: exceeding a threshold number of individuals of an audience for a specified skill level and preference, exceeding a threshold percentage of individuals of the audience for the specified skill level and preference, reaching a majority of individuals of the audience for the specified skill level and preference, receiving a largest number of votes from the audience for the specified skill level and preference, and the set of individual preferences for a specific individual; and program code, stored on the non-transitory computer readable storage device, for presenting the first version to a corresponding first portion of the audience and the different second version of the set of versions of the presentation selected from the plurality of versions of the presentation to a corresponding second portion of the audience concurrently.

7. The computer program product of claim 6, wherein a preference in the set of individual preferences for an individual comprises a skill level of the individual associated with a type of content in the presentation.

8. The computer program product of claim 6, wherein the program code, stored on the non-transitory computer readable storage device, for selecting the first set of slides of the first version of the presentation from the plurality of versions of the presentation based on the first set of audience preferences and the different second set of slides of the different second version of the presentation from the plurality of versions of the presentation based on the second set of audience preferences to form the set of versions of the presentation further comprises program code, stored on the non-transitory computer readable storage device, for selecting the first version of the presentation from the plurality of versions of the presentation in response to determining that a largest number of the set of audience preferences is associated with the first version of the presentation.

9. The computer program product of claim 6, wherein the program code, stored on the non-transitory computer readable storage device, for selecting the first set of slides of the first version of the presentation from the plurality of versions of the presentation based on the first set of audience preferences and the different second set of slides of the different second version of the presentation from the plurality of versions of the presentation based on the second set of audience preferences to form the set of versions of the presentation further comprises program code, stored on the non-transitory computer readable storage device, for selecting a version of the presentation from the plurality of versions of the presentation based on a set of individual preferences for an individual in the plurality of individuals and wherein the program code, stored on the non-transitory computer readable storage device, for presenting the set of versions of the presentation selected from the plurality of versions of the presentation further comprises program code, stored on the non-transitory computer readable storage device, for presenting at least one of the first version and the different second version of the presentation on a mobile device.

10. The computer program product of claim 6, wherein the program code, stored on the non-transitory computer readable storage device, for presenting the first set of slides of the first version of the presentation selected from the plurality of versions of the presentation further comprises program code, stored on the non-transitory computer readable storage device, for presenting the first set of slides and further comprising program code, stored on the non-transitory computer readable storage device, for presenting on a mobile device the different second set of slides based on the set of individual preferences for an individual of the plurality of individuals.

* * * * *